United States Patent [19]

Takahashi et al.

[11] 3,757,254

[45] Sept. 4, 1973

[54] NOISE REDUCTION SYSTEM AND APPARATUS USING A COMPRESSION AND EXPANSION SYSTEM

[75] Inventors: Nobuaki Takahashi; Yukinobu Ishigaki, both of Yamato; Yasuo Itoh, Tokyo, all of Japan

[73] Assignee: Victor Company of Japan, Ltd., Yokohama-City, Kanagawa-ken, Japan

[22] Filed: June 3, 1971

[21] Appl. No.: 149,687

[30] Foreign Application Priority Data

June 5, 1970 Japan ............................... 45/48183

[52] U.S. Cl. .............. 333/14, 179/100.2 K, 325/65, 338/20

[51] Int. Cl. ............................................ H04b 1/64

[58] Field of Search .................. 333/14; 325/62, 65; 179/100.2 R, 100.2 K

[56] References Cited

UNITED STATES PATENTS 2,193,966 3/1940 Jones .................................... 333/14

3,379,839 4/1968 Bennett............................. 333/14 X

*Primary Examiner*—Paul L. Gensler

*Attorney*—Louis Bernat

[57] ABSTRACT

A noise reduction system employs a compression and expansion system using a compressor and an expandor to reduce noise in a signal transmitted through a transmission system. The compressor side of the system comprises a compression circuit means provided in an open loop, through which the signal passes. A control circuit means generates a control voltage in accordance with the level of the output signal from the compression circuit means. This control voltage is applied to the compression circuit means, thereby to control compression ratio. The expandor side comprises an expansion circuit means which is provided in a negative feedback loop of a negative feedback amplifier. A control circuit means generates a control voltage in accordance with the level of the input signal to the negative feedback amplifier. This control voltage is applied to the expansion circuit means, thereby to control expansion ratio. The compressor and the expandor are so constructed that a coefficient $k$ of amplitude control characteristic of the compressor, and a feedback ratio $\beta$ of the expandor become equal to each other. The expansion apparatus can be constructed independently and used in the aforementioned system.

17 Claims, 32 Drawing Figures

INVENTORS
NOBUAKI TAKAHASHI
YUKINOBU ISHIGAKI
YASUO ITOH
BY
Louis Bernat
ATTY.

INVENTORS
NOBUAKI TAKAHASHI
YOKINOBU ISHIGAKI
BY YASUO ITOH

ATTY.

INVENTORS
NOBUAKI TAKAHASHI
YUKINOBU ISHIGAKI
BY YASUO ITOH

Louis Bernat

ATTY.

INVENTORS
NOBUAKI TAKAHASHI
YUKINOBU ISHIGAKI
YASUO ITOH
BY
Louis Bernat ATTY.

INVENTORS
NOBUAKI TAKAHASHI
YUKINOBU ISHIGAKI
BY YASUO ITOH

Louis Bernat ATTY.

INVENTORS
NOBUAKI TAKAHASHI
YUKINOBU ISHIGAKI
YASUO ITOH
BY
ATTY.

INVENTORS
NOBUAKI TAKAHASHI
YUKINOBU ISHIGAKI
BY YASUO ITOH
ATTY.

INVENTORS
NOBUAKI TAKAHASHI
YUKINOBU ISHIGAKI
BY YASUO ITOH
ATTY.

INVENTORS
NOBUAKI TAKAHASHI
YUKINOBU ISHIGAKU
BY YASUO ITOH
ATTY.

INVENTORS
NOBUAKI TAKAHASHI
YUKINOBU ISHIGAKI
YASUO ITOH
BY
ATTY.

NOISE REDUCTION SYSTEM AND APPARATUS USING A COMPRESSION AND EXPANSION SYSTEM

This invention relates to a noise reduction system and apparatus using a compression and expansion system and more particularly to a system for reducing noise in a signal transmission system and improving the signal to noise ratio by using a compressor and an expandor.

A signal transmission system of the tape contemplated herein includes a communication system in which a signal is transmitted and received, and a recording and reproducing system in which a signal is recorded on and reproduced from recording medium such as a magnetic tape or a record disc. A known method for reducing noise in such a system is by adopting a compression and expansion system, which employs a compressor and an expandor.

A compandor (a name for a combination of a compressor and an expandor) has been used in the aforementioned compression and expansion system in the communication system. This compandor is designed only to have characteristics required for obtaining a desired signal to noise ratio in the object communication system. As a result, in the conventional compression and expansion system, a distortion in a signal tends to increase. A reproduction of a signal with high fidelity at a receiving side cannot be expected, even though the signal to noise ratio may have been improved.

As to various systems adopted for improving a signal to noise ratio in the recording system, these systems are not free from many disadvantages, such that an input-output characteristic deteriorates, a dynamic range is reduced, distortion in signal increases due to deterioration in frequency characteristic, and also dynamic modulation noise deteriorates tone quality. Although the signal to noise ratio may have been improved.

As an apparatus for improving the signal to noise ratio in the recording system, there is a system known as the Dolby signal to noise stretcher, developed by the Dolby Laboratory of United Kingdom. The Dolby stretcher has a special construction, such that its frequency band is divided into four parts, each of which has a different control ratio as compared to the other parts. Consequently, the Dolby stretcher is disadvantageous in that the circuit thereof a complicated construction and requires a large number of component parts, whereby the manufacturing cost is increased. Besides, the Dolby stretcher requires a precise adjustment and a high degree of skillfulness in the use thereof, because, if an input signal level changes slightly, for example, ±2 dB from the regular level, a frequency response characteristic will change to a large extent. Further, it has a disadvantage, even if the apparatus is very well adjusted since a curve portion appears in an input-output characteristic in the vicinity of −20 dB to −30 dB.

A difference in level also appears in frequency response characteristic.

Further, as a system for improving the signal to noise ratio in the recording system, a noise reduction apparatus in which a transformer is used as a circuit element has been proposed. This apparatus, however, produces a high level of inductive noise and the frequency and phase characteristics deteriorate with a resulting distortion of the signal due to the employment of the transformer as the circuit element. Accordingly, this apparatus is not suitable for a high fidelity recording and reproducing apparatus.

It is, therefore, a general object of this invention to eliminate the above described disadvantages and provide a novel and useful noise reduction system employing a compression and expansion system.

Another object of the invention is to provide a noise reduction system employing a compression and expanion system using the same circuit parts to determine the characteristics of the compressor and the expandor.

This enables a very simple circuit construction to reduce noise effectively and to greatly improve an input-output characteristic and a frequency-distortion factor.

A still another object of the invention is to provide a noise reduction system in which a distortionless noise-reduced output signal is obtained. This is achieved by splitting an input signal into two signals having a mutually opposite phase, and then mixing the two output signals together after inverting the phase of one of the output signals.

A further object of the invention is to provide a system which is capable of reducing noises effectively by changing a frequency to compression-expansion ratio in a frequency band, such as high and middle frequency bands where noise distribution is great. In a frequency band where noise distribution is low, the compression and expansion operations are practically stopped. In the system, a time constant circuit can be composed, as desired, depending upon the state of the noise band. Accordingly, a dynamic operation is completely compensated for and the signal is stabilized. Further, noise is effectively reduced without incrasing a modulation noise and deteriorating tone quality.

A further object of the invention is to provide a system which is capable of reducing noise effectively, without producing higher harmonic distortions by using NPN type and PNP type transistors as control elements.

A further object of the invention is to provide a noise reduction system employing a compression and expansion system in which the bias of a control element circuit is stabilized.

A still further object of the invention is to provide a compression apparatus, a recording medium on which an output signal of a compression is recorded, and an expansion apparatus in the above described noise reduction system using a compression and expansion system. The compression apparatus, recording medium and expansion apparatus are separately constructed and respectively used in this system.

Other objects and features of the invention will become apparent from the description made hereinbelow with reference to the accompanying drawings, in which.

Figure 12A:
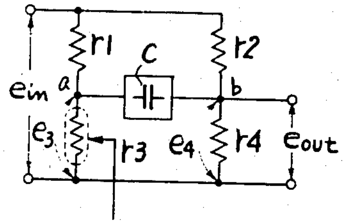
Figure 12B:
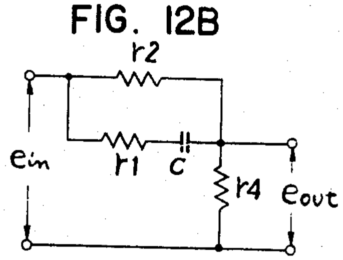
Figure 12C:
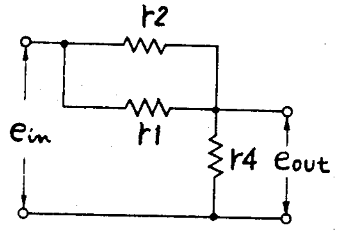
Figure 12D:
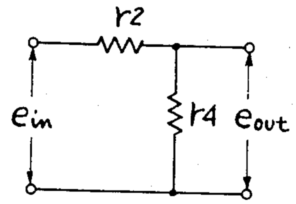
Figure 13:
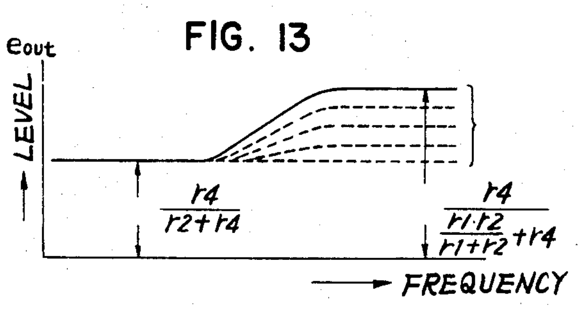
Figure 11:
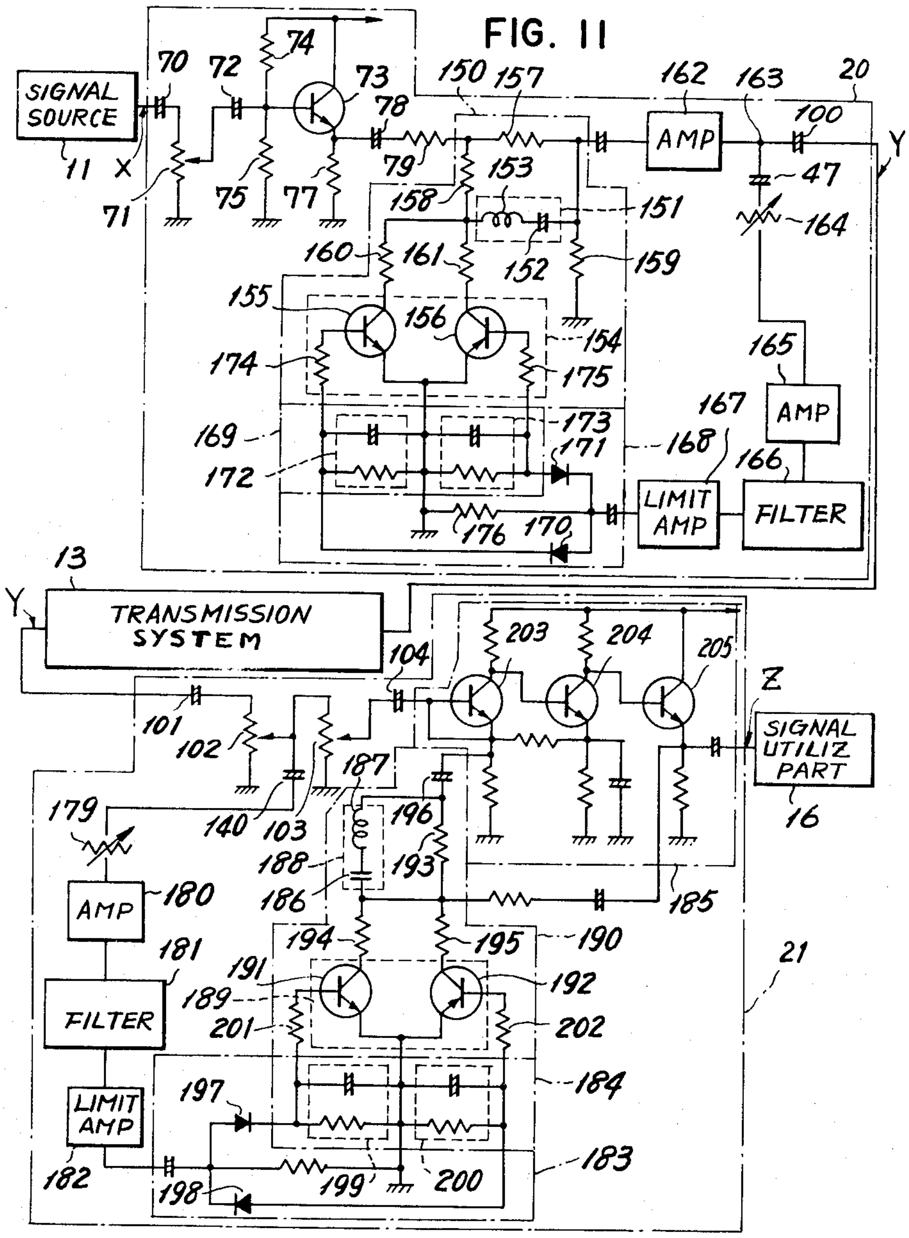
FIG. 11 is a block circuit diagram of a third embodiment of the system according to the invention.
Figure 14:
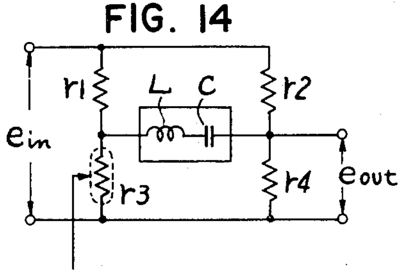
Figure 15:
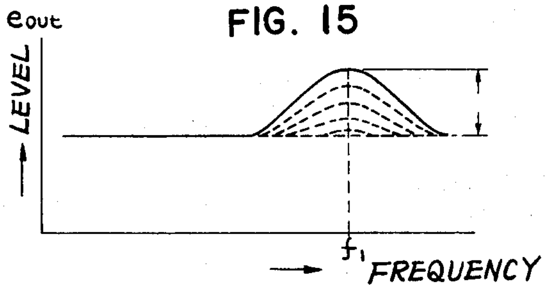
Figure 16:
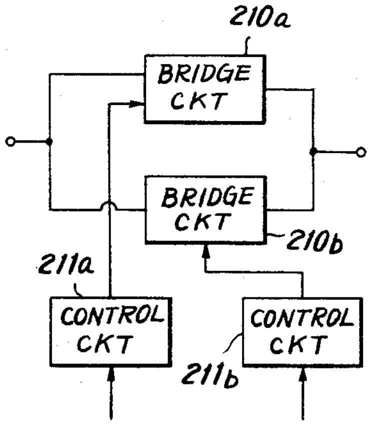
Figure 17:
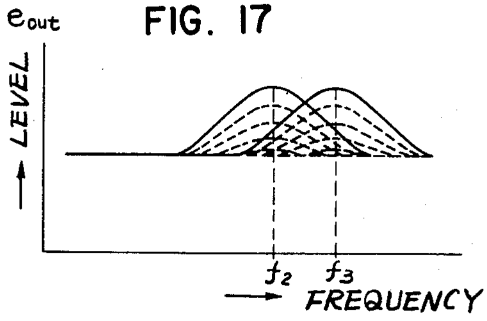
Figure 18A:
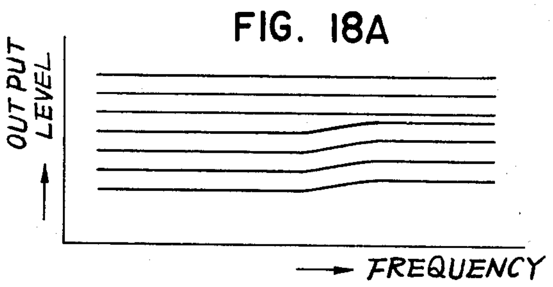
Figure 18B:
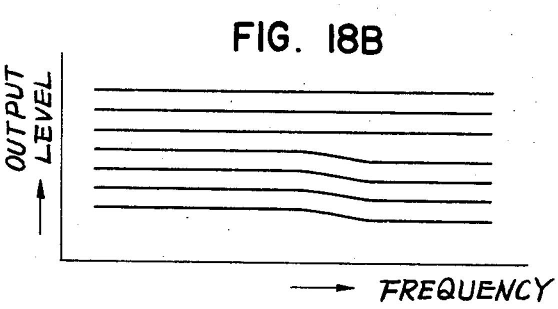
Figure 19:
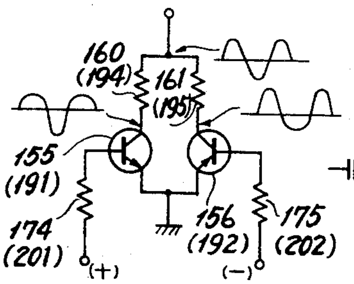
Figure 20:
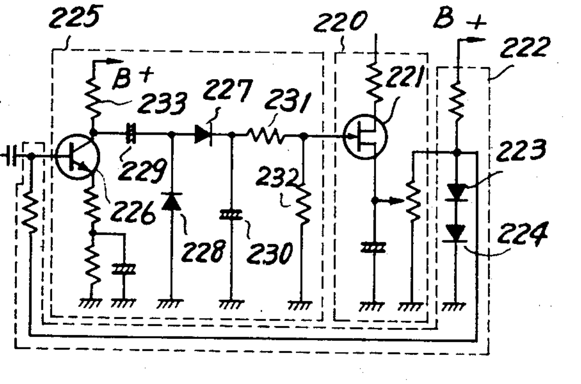
Figure 21:
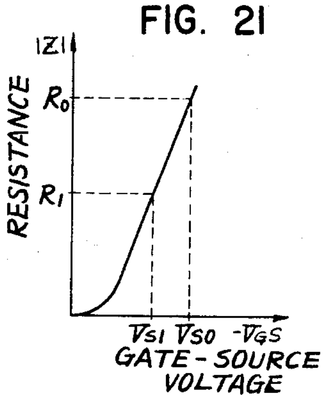
Figure 22:
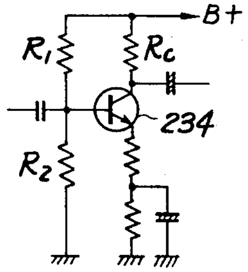

FIGS. 12A to 12D inclusiove are circuit diagrams for illustrating an operation of an embodiment of a bridge circuit;

FIG. 13 is a graphic diagram showing the frequency characteristic of the bridge circuit shown in FIGS. 12A to 12D inclusive;

FIG. 14 is a circuit diagram for illustrating another embodiment of the bridge circuit;

FIG. 15 is a graphic diagram showing a frequency characteristic of the bridge circuit shown in FIG. 14;

FIG. 16 is a block circuit diagram of an example using two bridge circuits;

FIG. 17 is a graphic diagram showing a frequency characteristic of the circuit shown in FIG. 16;

FIGS. 18 A and 18B are graphic diagrams showing frequency characteristics of the compressor and the expandor in the circuit shown in FIG. 11;

FIG. 19 is a circuit diagram for illustrating a control element circuit part in the block circuit diagram shown in FIG. 11 and also showing a waveform at each point;

FIG. 20 is a circuit diagram of one embodiment of a bias stabilizing circuit for the expansion control circuit of the expandor;

FIG. 21 is a graphic diagram showing a gate-source voltage-resistance characteristic of a FET shown in FIG. 20;

FIG. 22 is a circuit diagram showing a general biasing method; and

FIGS. 23A to 23E inclusive are graphic diagrams respectively showing relationships between electric current, voltage and resistance.

Figure 1:
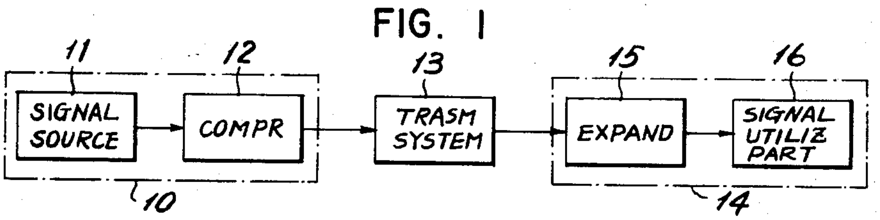
FIG. 1 is a block diagram of a general compression and expansion system for use in the system according to the invention.

FIG. 1 is a block diagram showing a general compression and expansion system for use in the system according to the invention. On a recording side (or a transmission side) 10, a signal supplied from a signal source 11 is compressed in a compressor 12. A recording and reproducing system including a recording medium or a transmission channel is hereinafter referred to as a transmission system 13. The output signal from the compressor 12 is transmitted to an expander 15, provided on a reproducing side (or a receiving side) 14. The signal expanded in the expandor 15 is supplied to a signal utilizing part 16.

Figure 2:
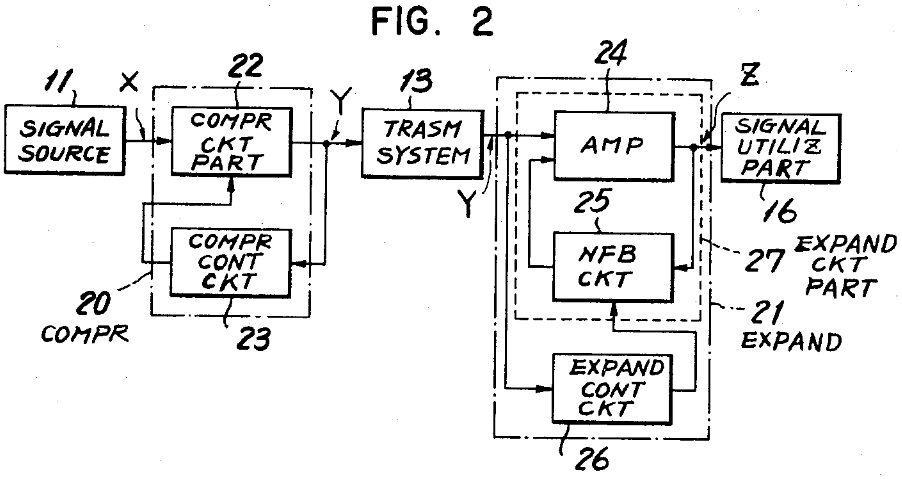
FIG. 2 is a block diagram for illustrating the principle of the nose reduction system of the compression and expansion system according to the invention.
Figure 6:
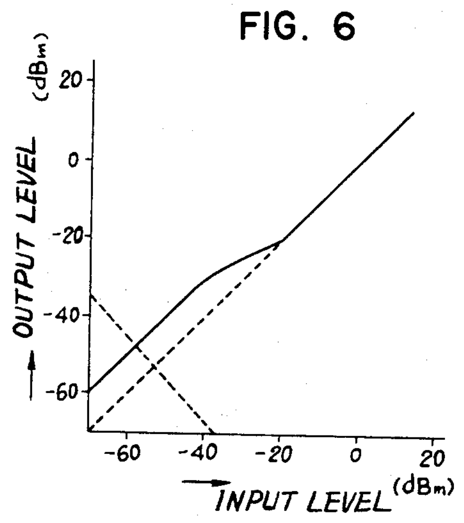
FIGS. 6 and 7 are graphic diagrams respectively showing the input-output characteristics of the compressor and the expandor.

This invention relates to an improvement in the compressor and expandor used in the aforementioned general compression and expansion system. FIG. 2 shows a block diagram illustrating one embodiment of the invention. A compressor 20 corresponds to the compressor 12 shown in FIG. 1. A circuit part 22 of compressor 20 controls a signal amplitude compression characteristic (hereinafter part 22 is referred to as an "compression circuit part") A compression control voltage generating and supplying circuit is hereinafter referred to as a "compression control circuit" 23. The input to compression control circuit 23 is; a part of the output from the compression circuit part 22. Responsive thereto, circuit 23 generates a compression control voltage which is supplied to the compression circuit part 22. The compressor 20 has an input-output characteristic as shown in FIG. 6.

Figure 7:
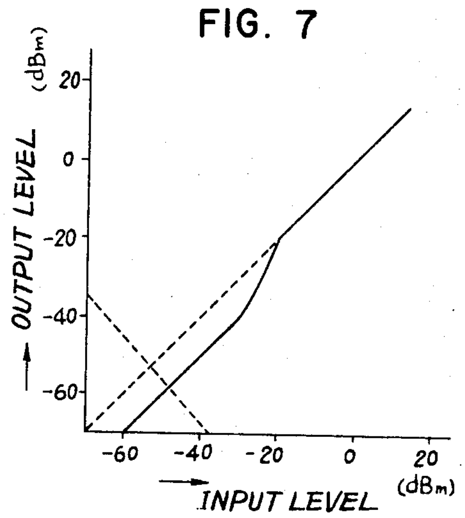

An expandor 21 (which corresponds to the expandor 15 shown in FIG. 1) comprises an amplifier 24, a negative feedback circuit 25, and an expansion control voltage generating and a circuit hereinafter referred to as an "expansion control circuit" 26. The amplifier 24 and the negative feedback circuit 25 constitute a circuit part for controlling a signal amplifute expansion characteristic. The combination of circuits 24, 25 are hereinafter referred to as an "expansion circuit part" 27. The negative feedback circuit 25 feeds back a part of the output from the amplifier 24 to the input of the amplifier 24. The expansion control circuit 26 generates an expansion control voltage responsive to the receipt of a part of the input to the amplifier 24, and thereupon, it supplies the control voltage to the negative feedback circuit 25. The expandor 21 has an input-output characteristic as shown in FIG. 7.

The transmission system 13 includes a recording and reproducing system, and a transmission channel as above described. The recording and reproducing system employs a recording medium such as a magnetic tape, magnetic disc, or record disc etc. The recording and reproducing system also employs means for recording an output signal of the compressor on the recording medium. Means are provided for reproducing the recorded signal from the recording medium. The transmission channel transmits an output signal of the compressor either on the air or through a cable. A compression apparatus having the compressor and an expansion apparatus having the expandor may be separately constructedunits. The recording medium on which the output signal of the compressor is recorded may be individually formed.

When a signal X is supplied to the compressor 20 from the signal source 11, the signal X is changed in its amplitude characteristic in the compression circuit part 22, which is controlled by the control voltage supplied from the compression control circuit 23. A coefficient K represents the total amplitude control characteristic exercised by the compression control circuit 23 and the compression circuit part 22 with respect to the input signal X. An output signal Y from the compressor 20 is expressed by the following equation:

$$Y = kX \ldots\ldots\ldots \quad (1)$$

The output signal Y from the compressor 20 is transmitted through the transmission system 13 and is supplied to the expandor 21 as the input signal Y. In the expandor 21, the amplitude characteristic of the input signal Y undergoes a change in the expansion circuit part 27. An output signal Z from the expandor 21 is supplied to the signal utilizing part 16.

If the amplification degree of the amplifier 24 of the expandor 21 is expressed as A and the feedback ratio of the negative feedback circuit 25 as $\beta$, the output signal Z of the expandor 21 is described by the equation :

$$z = ( AY/1 + A\beta ) \ldots\ldots \quad (2)$$

If a relationship $A\beta >> 1$ is satisfied in the above equation (2), the equation (2) may also be expressed as $$Z = Y/\beta \ldots\ldots\ldots \quad (3)$$

If a relationship between the signal X and the signal Z is obtained by substituting the equation (1) into the equation (3), the relationship between the signals X and Z is expressed by the equation:

$$Z = kX/\beta \ldots\ldots\ldots (4)$$

If the relationship is $k = \beta$ where the coefficient $k$ represents the amplitude control characteristic of the compressor 20 and the feedback ratio $\beta$ refers to the negative feedback circuit 25 of the expandor 21, the relationship between the input signal X of the compressor 20 and the output signal Z from the expandor 21 will be $$Z = X \ldots\ldots\ldots\ldots \quad (5)$$

One example of an amplitude control characteristic of the control systems in the compressor 20 and the expandor 21 is shown in FIG. 6.

Figure 8:
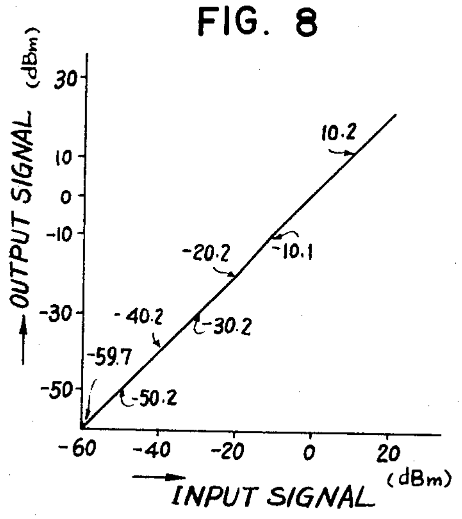
FIG. 8 is a graphic diagram showing the input-output characteristic of the whole system in the system according to the invention.

Accordingly, if the coefficient $k$ and the feedback ratio $\beta$ are selected so that both become equal, an input-output characteristic of the signal in the whole system becomes linear as shown in FIG. 8.

Figure 3:
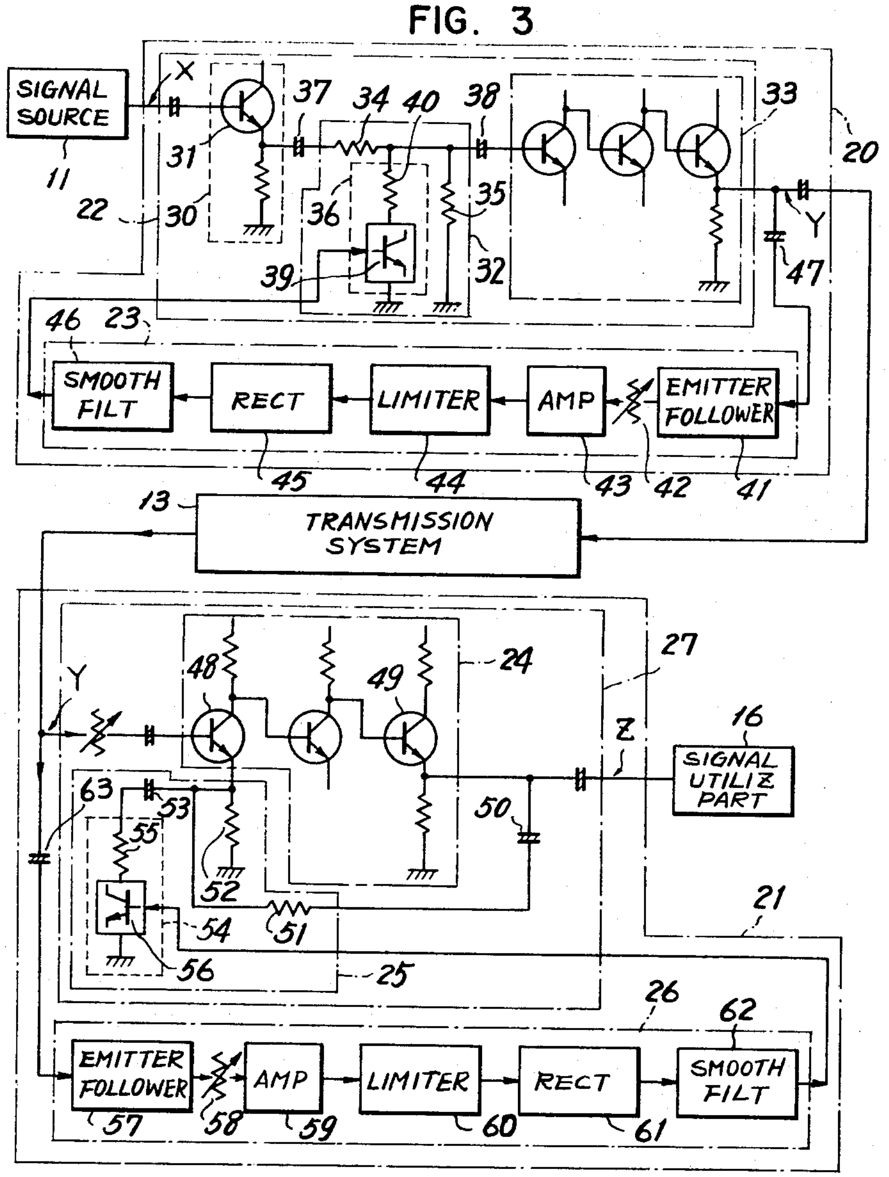
FIG. 3 is a block circuit diagram of a first embodiment of the system according to the invention.

Hence, by selecting the coefficient $k$ and the feedback ratio in this manner, no distortion of signal occurs in the system and the signal to noise ratio of the system is improved Next to be described is one embodiment of a practical construction of the system according to the invention, with reference to FIG. 3. The compression circuit part 22 of the compressor 20 comprises an emitter follower stage 30 of a transistor 31 which is provided for supplying the input signal X with a low output impedance to a compression circuit 32, the compression circuit 32, and an amplifier stage 33 which is provided for amplifying the output signal from the compression circuit 32.

In case the amplifier stage 33 is provided in the compression circuit part 22 as described above, the relationship $Y = kX$ of the equation (1) described with reference to FIG. 2 is rewritten as $Y = kX.\ Ac$ . . . (1*a*). The factor Ac represents an amplification degree of the amplifier stage 33. The relationship $Z = X$ of the equation (5) is also rewritten as $Z = X.\ Ac$ . . . (5*a*).

The above change however, in no way affects the characteristics of the system according to the invention.

Figure 4:
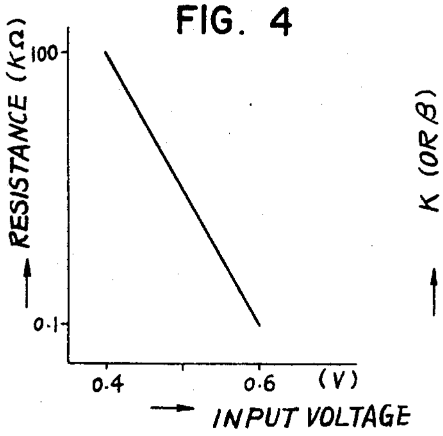
FIG. 4 is a graphic diagram showing an example of the characteristic of a control element.

The compression circuit 32 constitutes a variable attenuation network with resistors 34 and 35 and a control element circuit 36. The resistor 34 is connected at one end thereof, to the emitter of a transistor 31 through a capacitor 37. One end of the resistor 35, and the other end of the resistor 34, are connected to the amplifier stage 33 through a capacitor 38. The other end of the resistor 35 is grounded. The control element circuit 36 is connected in parallel with the resistor 35. The control element circuit 36 includes a semiconductor control element (transistor) 39, operating as a variable resistor element of which the resistance varies with the input voltage as shown in FIG. 4. A limiting resistor 40 is connected in series with the control element 39.

The limiting resistor 40 has a resistance value within a range of variation of the value of resistance in the control element circuit 36. The resistance value of the control element circuit 36 is a sum of the resistance value of the resistor 40 and the internal resistance value between the collector and the emitter of the transistor 39, which varies with the control voltage applied to the base. In the following description, the value of resistance of the control element circuit 36 is represented as VR. Instead of the transistor 39, FET or a composite element of a lamp and a photocell may be used as the control element.

The input signal X, supplied from the emitter follower stage 30 to the compression circuit 32 which includes the variable attenuation network, is attenuated by the magnitude determined by the following equation (6). Signal X is supplied to the amplifier stage 33.

$$[\ R2/R1 + R2 + (R1 \cdot R2/VR)\ ] \ldots\ldots \quad (6)$$

where R1 is the value of resistance of the resistor 34 and R2 is the value of resistance of the resistor 35.

The value given by the above equation (6) varies in accordance with variation of the resistance VR of the control element circuit 36. Resistance VR, in turn, varies in accordance with variation of control voltage supplied from the compression control circuit 23, to be described later. The amount of the attenuation of the input signal X varies with the value given by the equation (6). Accordingly, the variation characteristic of the value given by the equation (6) represents a combined characteristic of (a) the control voltage characteristic of the compression control circuit 23 and (b) the resistance variation characteristic of the control element circuit 36, (that is, the coefficient $k$ of the amplitude control characteristic of the compressor 20).

The compression control circuit 23 of the compressor 20 comprises a transistor emitter follower stage 41, a control signal level adjuster 42, an amplifier stage 43, a limiter 44 (provided if necessary), a rectifier 45, and a smoothing filter network 46 having a suitable time constant. The transistor of the emitter follower stage 41 is supplied with a signal from the output circuit of the compression circuit part 22 through a capacitor 47. The compression control circuit 23 generates a DC control voltage in response to the output signal Y of the compressor 20. This control voltage is supplied to the control element 39 of the compression circuit part 22. If the limiter 44 is used as in the present embodiment, the DC control voltage of the compression control circuit 23 becomes a constant value of voltage, which is above a voltage at which the limiter 44 starts to operate. This control voltage changes the internal resistance of the control element 39 and changes the input signal X into a value kX by varying the attenuation ratio with respect to the input signal X.

Accordingly, an input-output characteristic of the compressor 20 becomes one as shown in FIG. 6. The relationship between the input signal X and the output signal Y becomes a linear one when the level of the input signal X exceeds a specific level.

Next to be described is the expandor 21 shown in FIG. 3. The signal Y is supplied from the compressor 20 as the input signal Y is sent through the transmission system 13.

The amplifier 24 of the expansion circuit part 27 has a suitable number of amplification stages. The final stages of the amplifier 24 is an emitter follower connection. An AC negative feedback circuit is constructed with a capacitor 50 and resistors 51 and 52 between the emitter of a transistor 49 in the final stage and the emitter of a transistor 48 in the first stage. A capacitor 53 and a control element circuit 54 are connected in series. This series connection is connected in parallel with an emitter resistor 52 of the transistor 48. The control element circuit 54 includes a resistor 55 and a control element 56 connected in series.

The feedback ratio $\beta$ of the negative feedback circuit 25, composed of the resistors 51 and 52 and the control element circuit 54, is expressed by the equation;

$$\beta = [R_2/R_1 + R_2 + (R_1 \cdot R_2/VR)] \ldots\ldots \quad (7)$$

where $R_1$ represents the resistance of the resistor 51, $R_2$ the resistance of the resistor 52 and VR the resistance of the control element circuit 54.

This equation (7) is identical to the equation (6). Accordingly, the negative feedback ratio $\beta$ will become equal to the above described coefficient $k$ of amplitude control characteristic of the compressor 20, if the resistance values of the resistors 51 and 52 and the control element circuit 54 in the negative feedback circuit 25 are made equal to the resistance values of the resistors 34 and 35 and the control element circuit 36 in the above described compression circuit 32. Then, if the amplification degree of the amplifier is expressed as A and the feedback ratio as $\beta = k$, and if there is a relation $A\beta >> 1$, the output signal Z of the expandor 21 is represented by the equation:

$$Z = Y/k \ldots\ldots \quad (8)$$

Since the input signal Y to the expandor 21 is represented by the euqation (1), i.e. $Y = kX$, the output signal Z of the expandor 21 becomes $$Z = (kX/k) = X \ldots\ldots \quad (9)$$

As in the case of the coefficient k described above, the above described feedback ratio $\beta$ includes a characteristic of the circuit (control circuit) generating the control voltage applied to its control element circuit 54. Hence, if the condition $\beta = k$ is to be satisfied, not only must the feedback circuit 25 of the expandor 21 and the compression circuit (attenuation network) 32 of the compressor 20 have substantially have the same construction, but also the expansion control circuit 26 of the expandor 21 and the compression control circuit 23 of the compressor 20 must also have substantially the same construction.

The expansion control circuit 26 comprises an emitter follower stage 57 of a transistor, a control signal level adjustor 58, an amplifier stage 59, a limiter 60 (provided if necessary), a rectifier 61 and a smoothing filter network 62 having a suitable time constant. The same input signal Y is supplied from the transmission system 13 through a capacitor 63 to a transistor of the emitter follower stage 57. The expansion control circuit 26 generates a DC control voltage corresponding to the output signal Y from the compressor 20. That is, the input signal Y to the expandor 21 is supplied to a control element 56 of the above described expansion circuit part 27. In case the limiter 60 is used, as in the present embodiment, the DC control voltage of the expansion control circuit 26 becomes a constant value if the voltage exceeds a value at which the limiter 17 starts to operate.

The characteristic of the expansion control circuit 26 may easily be made identical with that of the compression control circuit 23 by using the emitter follower stage 57, level adjuster 58, amplifier stage 59, limiter 60, rectifier 61 and smoothing filter network 62 of the expansion control circuit 26. All of these circuits have the same construction as the emitter follower stage 41, level adjuster 42, amplifier stage 43, limiter 44, rectifier 45 and smoothing filter network 46 of the compression control circuit 23.

As described hereinabove, the compression control circuit 23 and the expansion control circuit 26 have the same construction and the same characteristic. Thus, the input signal applied thereto is the same (the signal Y), the control voltages obtainable from the two control circuits 23 and 26 are of the same magnitude. Further, the compression circuit 32 of the compressor 20 and the feedback circuit 25 of the expandor 21 respectively controlled by the control voltages obtainable from the aforementioned control circuits 23 and 26 have the same construction. Therefore, it is apparent that the coefficient k of amplitude control characteristic of the compressor 20 and the feedback ratio $\beta$ of the expandor 21 are of the same value.

In case the control element 39 is a transistor as described in the foregoing embodiment, the transistor becomes non-conductive if the control voltage applied thereto decreases. The coefficient $k$ of the compressor 20 and the feedback ratio $\beta$ of the expandor 21 at this state become a fixed value given by the equation:

$$k = \beta = R_2/R_1 + R_2 \ldots\ldots \quad (10)$$

Figure 5:
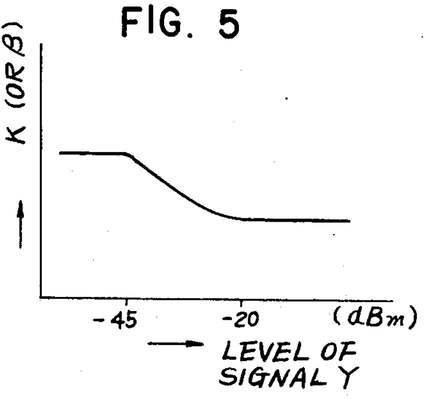
FIG. 5 is a graphic diagram showing a characteristic of a control system in the compressor and the expandor.

The above state is clearly shown in the portion corresponding to the low signal level on each characteristic curve shown in FIGS. 5, 6 and 7. Incidentally, the portion of the characteristic curve, which corresponds to the high signal level in each of the aforementioned figures, clearly shows that the limiter is operating in that portion.

FIG. 8 shows a relative level of the input signal X to the compressor 21 and the output signal Z from the expandor 21 which is obtained by actually carrying out this invention. In the figure, there is a difference in the level in the order of ± 0.2 dB between the two signal levels. This difference is considered to have arisen partly due to a difference between the input and output signal levels caused by adoption of the equation (3), i.e. $Z = Y/\beta$ by applying the condition $A\beta >> 1$ to the equation (2) i.e. $Z = AY/1 + A\beta$, and partly due to slight differences existing between each component part of the compressor 20 and the expandor 21. In any event, the aforementioned difference in the order of ±

0.2 dB between the input and output signal levels has no adverse effect whatsoever in the practical application of the invention.

Figure 9A:
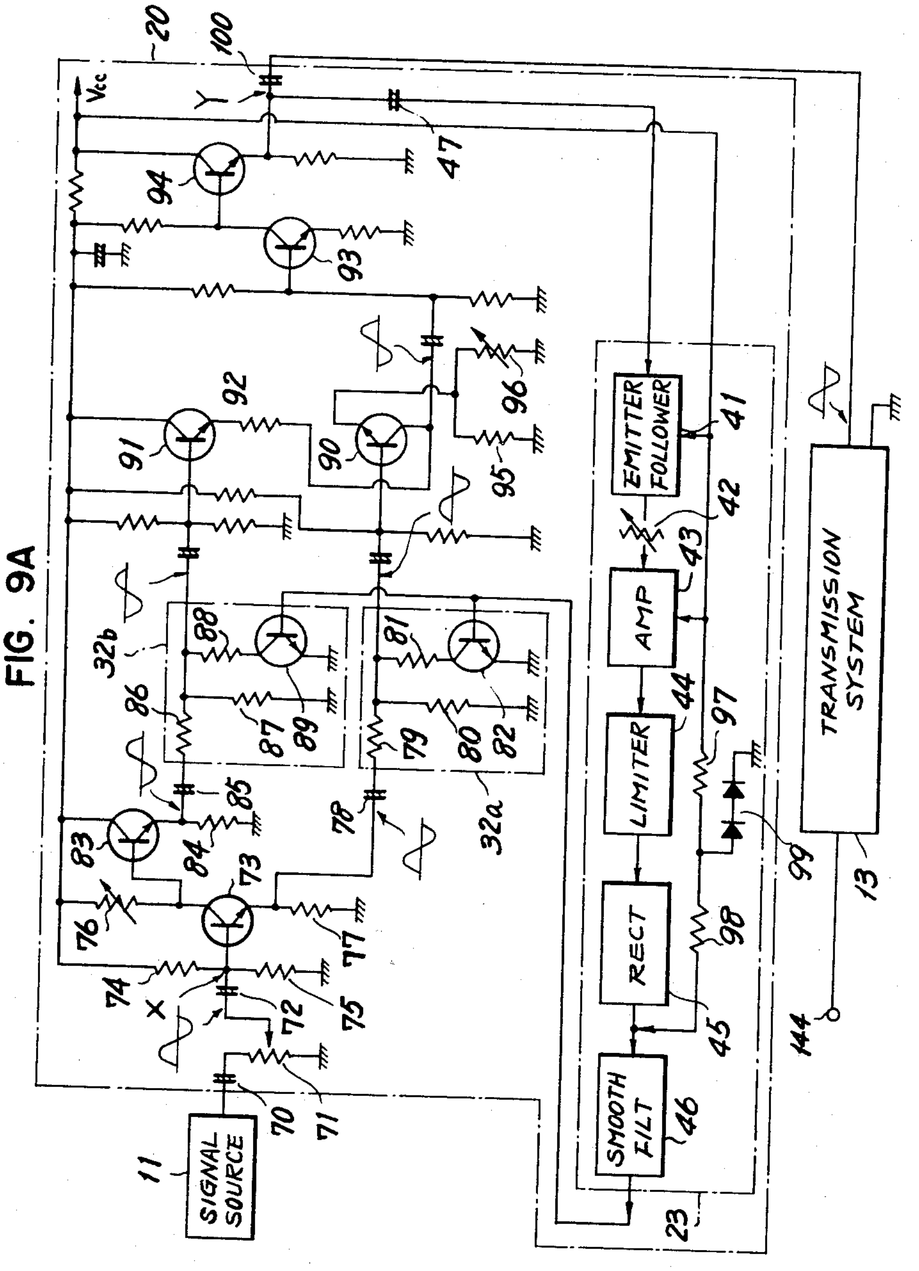
FIGS. 9A and 9B are block circuit diagrams for illustrating a second embodiment of the system according to the invention.
Figure 9B:
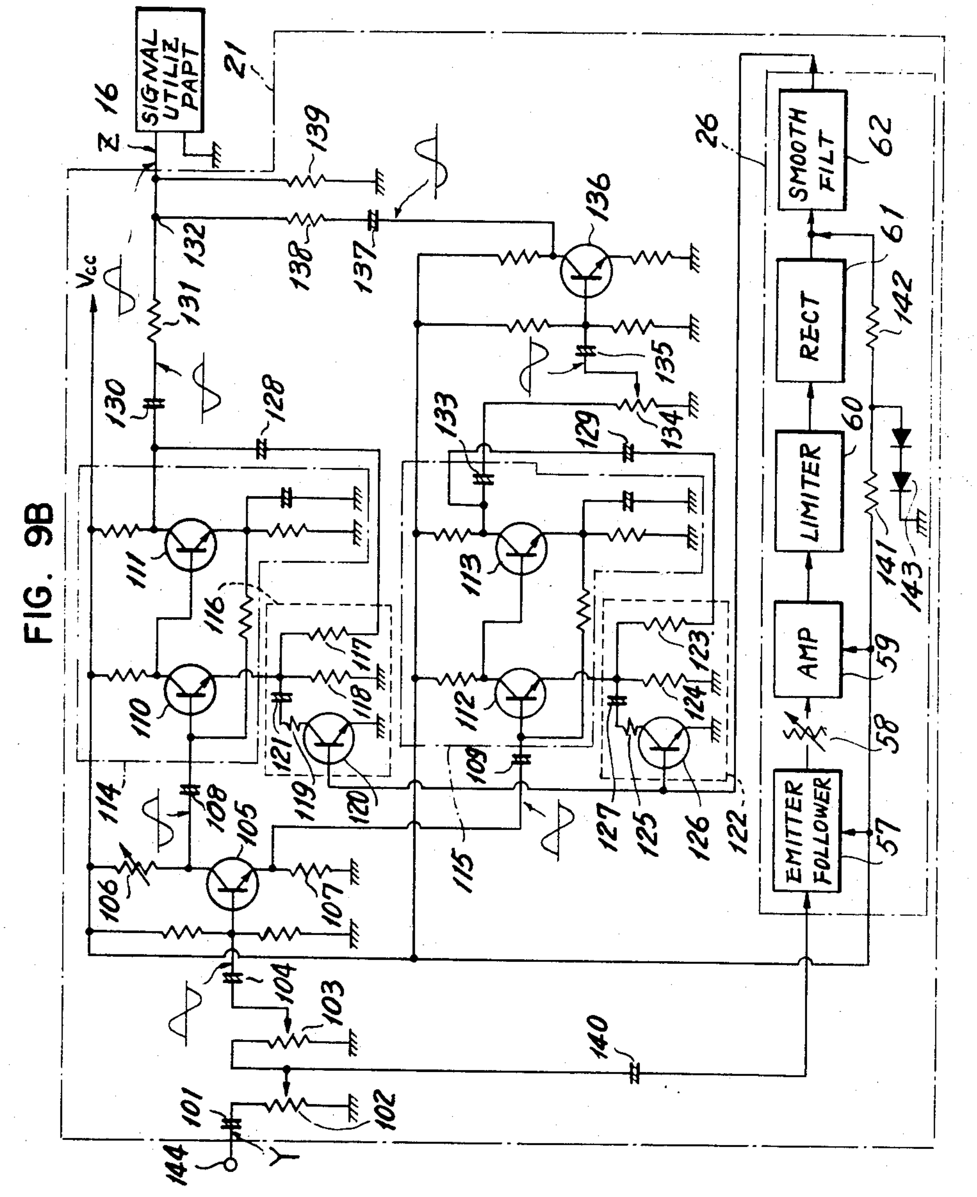

Next to be described is the second embodiment of the system according to the invention, with reference to FIGS. 9A and 9B. In the first embodiment described with reference to FIG. 3, the value of the internal resistance of the control element 39 (the resistance between the collector and the emitter of thetransistor) varies in accordance with the variation of the voltage the transistor) the collector and the emitter, even when a constant DC control voltage is applied to the base. Consequently, an amplitude distortion occurs in a signal applied to the network. Hence, the output signal includes many higher harmonic components resulting in deterioration of the distortion factor.

The second embodiment of the invention is directed to eliminate a higher harmonic distortion caused by the aforementioned characteristic of the control element, which is respectively used in the compressor 20 and the expandor 21. In FIG. 3 and FIGS. 9A and 9B, the same reference numeral is used to designate the same component part, and a description thereof will be omitted. In FIG. 9A, the input signal X from the signal source 11 is supplied to the base of a transistor 73 through a capacitor 70, a variable resistor 71, and a capacitor 72. Bias resistors 74 and 75 are connected to the base of the transistor 73 (in the description made hereinbelow, no reference will be made to a general bias circuit, a load circuit, and other general circuit parts). A variable resistor 76 and an emitter resistor 77 are respectively connected to the collector and the emitter of the transistor 73. The transistor 73 operates as a phase inverting stage in which signals having mutually opposite phase are taken out from its emitter and collector sides.

The signal output from the emitter side of the transistor 73 is supplied to a compression circuit(variable attenuation network) 32a comprising resistors 79, 80, and 81 and a control element 82 (in this embodiment, a transistor) through a capacitor 78. The signal output from the collector side of the transistor 73 is supplied to the base of a transistor 83, connected in an emitter follower configuration, the signal being taken through an emitter resistor 84. The signal output from the emitter side of transistor 83 is supplied through a capacitor 85 to a compression circuit 32*b* (which forms a variable attenuation network). Circuit 32*b* comprises resistors 86, 87, and 88 and a control element 89 (in this embodiment, a transistor).

The variable resistor 76 is provided for adjusting the aforementioned two signals taken from the emitter and collector of the transistor 73 and having a mutually opposite phase. These signals have the same amplitude when applied through the capacitors 78 and 85 to the respective compression circuits 32*a* and 32*b*. The compression circuits 32*a* and 32*b* respectively change the attenuation degree of the signals, responsive to a control voltage applied by the compression control circuit 23. The output signals from the compression circuits 32*a* and 32*b* are respectively supplied to the bases of transistors 90 and 91. When the signals pass through the compression circuits 32*a* and 32*b*, their waveforms change due to variations in resistance values of the control elements 82 and 89. Consequently, the signals supplied to the transistors 90 and 91 include many higher harmonic distortions.

The transistor 91 forms an amplifier circuit of an emitter follower configuration. The output signal from the transistor 91 is in phase with the input signal supplied to the base thereof. The transistor 90 forms an amplifier circuit of grounded emitter configuration. The output signal from the transistor 90 has an opposite phase as compared to the input signal supplied to the base thereof. The emitter of the transistor 91 and the collector of the transistor 90 are connected in series via a resistor 92. Accordingly, the higher harmonic distortions are eliminated or remarkably reduced in a composite output signal of the transistors 90 and 91 taken out of the collector side of the transistor 90. This reduction occurs because the output signals from the two transistors have mutually opposite phases when they are formed into the composite output signal. This output signal is then transmitted, as an output signal Y, from the compressor 20 via transistors 93, 94, and a capacitor 100 to a transmission system 13.

A resistor 95 and a variable resistor 96 are connected in parallel with each other and between the emitter of the transistor 90 and the ground. These resistors are provided for adjusting the operation of the circuit so that the output signals from the transistors 90 and 91 are properly related. The resistor 95 may be omitted from the circuit.

As in the first embodiment previously described, the compression control circuit 23 comprises the emitter follower stage of a transistor 41, the control signal level adjuster 42, the amplifier stage 43, the limiter 44, the rectifier 45, and the smoothing filter network 46. In the present embodiment, the compression control circuit 23 further has resistors 97, 98, and at least one voltage stabilizing diode 99. The circuit comprising the resistors 97 and 98, and the diodes 99 is provided for applying a bias voltage (in the order of 0.4V) to the variable attenuation control elements 82 and 89. This bias voltage prevents distortions in waveform which might occur due to a curve in the neighborhood of the cut-off region in the control characteristic of the control elements 82 and 89.

The expandor 21 will be described. In FIG. 9B, the input signal Y is supplied to the expandor 21 through the transmission system 13 and a terminal 144. This signal is applied to the base of a transistor 105 via a capacitor 101, variable resistors 102, 103, and a capacitor 104. The transistor 105 is provided for splitting the input signal into two signals. Variable resistor 106 and a resistor 107 are connected respectively to the collector and the emitter of the transistor 105. These resistors have values which give the signals the same amplitude and a mutually opposite phase. The split signal halves are sent out through capacitors 108 and 109. In the circuit of the present embodiment, by varying the resistance of the variable resistor 106, the state of balance between the two signals is adjusted to have mutually opposite phases.

The signals transmitted through the capacitors 108 and 109 are supplied to an amplifier circuit 114 comprising transistors 110, 111, and to an amplifier circuit 115 comprising transistors 112 and 113. The amplifier circuit 114 is constructed as a negative feedback amplifier circuit. A negative feedback circuit 116 is connected between the collector of the transistor 111 and the emitter of the transistor 110. The negative feedback circuit 116 includes resistors 117, 118, and 119, a transistor 120, and a capacitor 121. The amplifier circuit 115 is constructed as a negative feedback circuit. A negative feedback circuit 122 is connected between the collector of the transistor 113 and the emitter of the transistor 112. The negative feedback circuit 122 includes resistors 123, 124, and 125, a transistor 126, and a capacitor 127. The negative feedback circuits 116 and 122 are respectively connected to the collectors of the transistors 111 and 113, through capacitors 128 and 129. The resistors 117 and 118 and the capacitor 121 are connected to the emitter of the transistor 110. The resistors 123 and 124 and the capacitor 127 are connected to the emitter of the transistor 112. The resistor 119 is connected between the capacitor 121 and the collector of the transistor 120, and the resistor 125 is connected between the capacitor 127 and the collector of the transistor 126.

The circuit constants of the circuit elements used in the feedback circuits 116 and 122 are the same as those of the circuit elements used in the aforementioned compression circuits 32*a* and 32*b* of the compressor 20. Accordingly, the feedback circuits 116 and 222 and the compression circuits 32*a* and 32*b* show the same AC characteristic. The condition $k = \beta$ is satisfied in this embodiment, as in the first embodiment. The capacitance values of the capacitors 121 and 127, in the feedback circuits 116 and 122, are selected at values which produce sufficiently low impedances against the lowest frequency within the object frequency band.

Figure 10:
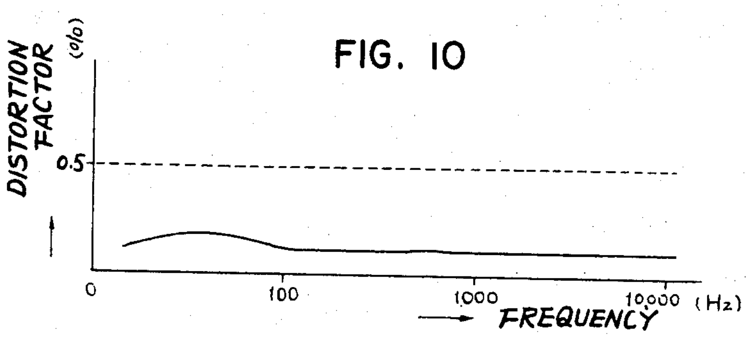
FIG. 10 is a graphic diagram showing a frequency-distortion factor of the output signal.

The output signal from the amplifier circuit 114 is sent through a capacitor 130 and a resistor 131 to a connecting point 132. The output signal from the amplifier circuit 115 is supplied to the base of a transistor 136 in a grounded emitter configuration. The signal path extends through a capacitor 133, a variable resistor 134, and a capacitor 135. The output signal, which is taken out of the collector of the transistor 136, is reversed in phase and sent through a capacitor 137 and a resistor 138 to the connecting point 132. The two signals sent to the connecting point 132 are mixed at a resistor 139 and supplied to a signal utilizing part 16, as a distortionless output signal Z. Since this output signal Z is obtained by mixing the two signals having a mutually opposite phase, the distortion factor of the output signal Z is very low in all frequency bands, as shown in FIG. 10.

The construction of the expansion control circuit 26, which applies the control voltages to the bases of the transistors 120 and 126 of the feedback circuits 116 and 122, is the same as that, of the first embodiment. The circuit 26 includes the emitter-follower stage 57, the control signal level adjuster 58, the amplifier stage 59, the limiter 60, the rectifier 61, and the smoothing filter circuit 62. The input signal Y is supplied from the variable resistor 102 through a capacitor 140 to emitter follower stage 57. The expansion control circuit 26 further has a circuit including resistors 141 and 142 and diodes 143. The characteristic of the expansion control circuit 26 (i.e., the relationship between the output control voltage and the input signal Y) is identical with that of the compression control circuit 23 of the compressor 20.

The signal passing through the amplifier circuit 115 is amplified to a larger extent than the signal passing through the amplifier circuit 114, by an amplifying circuit of the transistor 136. The variable resistor 134 is adjusted to make uniform the amplitudes of the signals applied to the connecting point 132.

Next to be described is the third embodiment of the system according to the invention (FIG. 11.) In a recording and reproducing system, generally, the noise distribution in each frequency band is different from each other. There is a tendency for the noise distribution to be greater in high and middle frequency bands of an audio frequency range. In view of this tendency, a bridge circuit is employed with a frequency characteristic which is variably adjusted according to a frequency band. In FIGS. 9A and 9B and FIG. 11, the same reference numeral is used to designate the same component part and the description thereof will be omitted.

The input signal X from the signal source 11 is applied to the base of the transistor 73. An output from the emitter of the transistor 73 is supplied to a bridge circuit 150 (shown by a dot-dashed line), through the capacitor 78 and the transistor 79. In the bridge circuit 150, a part 151 (surrounded by a broken line) is an LC element circuit which consists of a capacitor 152 and a coil 153. As a circuit element constituting the circuit 151, the capacitor 152 may be used alone. This LC element circuit 151 operates for a high band increase or a band increase. A part 154 (surrounded by a broken line) in the bridge circuit 150 is a control element circuit which includes transistors 155 and 156. This circuit operates for increasing (compressing) the level of a band in which noise is to be reduced, as will be described later. The bridge circuit 150 further has resistors 157 to 161.

The signal which has passed through the bridge circuit 150 is developed at a connecting point 163, after having being amplified by a linear amplifier circuit 162. The output signal developed at the connecting point 163 is supplied through a variable resistor 164 to a control signal amplifier circuit 165, for setting a control signal level. The signal amplified in the amplifier circuit 165 passes through a filter circuit 166, which is provided for giving the signal a frequency characteristic which is substantially the same as the frequency characteristic of the bridge circuit 150. The output signal from the filter circuit 166 is supplied through a limiter amplifier circuit 167 to a rectifier circuit 168 and then to a time constant circuit 169 respectively. A control voltage obtained from the time constant circuit 169 is applied to the control element circuit 154.

The rectifier circuit 168 comprises diodes 170 and 171, and a resistor 176. The diodes 170 and 171 are connected in parallel with each other and in opposite polarity. Accordingly, positive and negative voltages are obtained from the rectifier circuit 168. The time constant circuit 169 comprises two time constant circuits 172 and 173. The positive and negative output control voltages from the time constant circuits 172 and 173 are respectively applied to the bases of the transistors 155 and 156 of the control element circuit 154, through resistors 174 and 175. The transistor 155 is an NPN transistor, and the transistor 156 is a PNP transistor. The transistors 155 and 156 are driven in a constant current mode by the aforementioned positive and negative control voltages, and they change their internal resistances. The changes in the internal resistances of the transistors 155 and 156 alter the balance of a bridge condition in the bridge circuit 150. Consequently, the signal which passes through the bridge circuit 150 has its frequency characteristic altered by the LC element circuit 151. The signal which has passed through the bridge circuit 150 is transmitted to the transmission system 13 via an amplifier 162, a connecting point 163 and the capacitor 100. Accordingly, the output signal Y from the compressor 20, is increased in its signal level particularly in the high and middle frequency bands as shown in FIG. 18A. The degree of increase in the signal level in the high and middle frequency bands depends, as shown by a plurality of lines in FIG. 18, upon the magnitude of the whole output level corresponding to the level of the input signal X.

The control element circuit 154 comprises the NPN transistor 155 and PNP transistors 156, in combination. Therefore, as shown in FIG. 19, the wave form of the output signal is a normal wave form even if the wave forms of the outputs of the transistors 155 and 156 have complementary distortions. In the output, there is no high harmonic distortions because they are cancelled.

The expandor 21 shown in FIG. 11 will be described. The signal Y is compressed in the high and middle bands in the compressor 20 and then is transmitted through the transmission system 13 to the expandor 21, as an input signal Y. The input signal Y passes through the capacitor 101 and the variable resistor 102 and then supplied, to the base of a transistor 203, through the variable resistor 103 and the capacitor 104. This signal is amplified in a three-stage direct-coupled amplifier circuit 185 including transistors 203, 204 and 205. Then it is transmitted, as an output signal Z, to the signal utilizing part 16.

The input signal passing through the variable resistor 102 is also supplied to a variable resistor 179 which is provided for setting the control signal level. The variable resistor 179, a control signal amplifier circuit 180, a filter circuit 181, a limiter amplifier circuit 182, a rectifier circuit 183 and a time constant circuit 184 constitute the expansion control circuit. This expansion control circuit performs the same operation as the compression control circuit of the compressor 20 including the variable resistor 164 acting through the time constant circuit 169.

In a negative feedback loop of the amplifier circuit 185, there is connected a bridge circuit 190 comprising an LC element circuit 188 and a control element circuit 189. The LC element circuit 188 includes a capacitor 186 and a coil 187. The control element circuit 189 includes an NPN transistor 191 and a PNP transistor 192. The bridge circuit 190 further comprises resistors 193, 194 and 195 and a capacitor 196. The rectifier circuit 183 comprises two diodes 197 and 198 connected in parallel with each other and in opposite polarity. The time constant circuit 184 includes two time constant circuits 199 and 200. The output control signals from the time constant circuits 199 and 200 are applied to the bases of the transistors 191 and 192, through resistors 201 and 202.

The bridge circuit 190 performs the same operation as the bridge circuit 150 of the compressor 20. However, the bridge circuit 150 is inserted in the open loop in the compressor 20, whereas the bridge circuit 190, in the expandor 21, is connected to the amplifier circuit 185 by a negative feedback loop. Accordingly, the amplifier circuit 185 operates in an opposite and complimentary manner with respect to the amplifier circuit in the compressor. Therefore, in the amplifier circuit having the bridge circuit 190, the signal level decreases particularly in the high and middle frequency bands. Thus, the expanding operation is performed.

The operation of the bridge circuit will be described with reference to FIGS. 12A through 12D, and FIG. 13, on the assumption that a circuit having only a capacitor C is used in lieu of the LC element circuit 151. The bridge circuit in FIG. 12A comprises resistances $r1$ to $r4$. The input signal is expressed as $e_{in}$ and the output signal as $e_{out}$. If the values of the resistances $r1$ to $r4$ are selected so that voltages $e_3$ and $e_4$ across the resistances $r3$ and $r4$ become equal, i.e., $e_3 = e_4$, the following equation is obtained;

$$r3/(r1 + r3) = r4/(r2 + r4) \; . \; . \; . \; . \; . \qquad (11)$$

From the equation (11), $$r1 \cdot r4 = r2 \cdot r3 \; . \; . \; . \; . \; . \; . \; . \; . \; . \; . \qquad (12)$$

Thus, the voltage at a point $a$ and the voltage at a point $b$ become equal.

In this balanced state, the frequency characteristic of the circuit will remain flat, even if the capacitor C is inserted between the points $a$ and $b$. Since, in this third embodiment, the control element circuit 189 is used as the resistance $r3$, the value of resistance $r3$ varies with the control voltage which in turn, varies with the level of a passing signal.

If the input signal level is infinitesimal, the value of the resistance $r3$ is infinite. Accordingly, the part of the resistance $r3$ is considered to have become open. The equivalent circuit thereof is shown in FIG. 12B. With respect to a high band frequency of the input signal, the capacitor C may be neglected. In this case, the circuit shown in FIG. 12B will be equivalent to the circuit shown in FIG. 12C. Then, the equation;

$$e_{out} = [r4/(r1 \cdot 2/r1+r2) + r4 \;] \cdot e_{in} \; . \; . \; . \qquad (13)$$

is obtained. Further, with respect to a low band frequency, the circuit becomes equivalent to the circuit shown in FIG. 12D. In this case, the equation;

$$e_{out} = (r2/r2 + r4) \cdot e_{in} \; . \; . \; . \; . \; . \qquad (14)$$

is obtained.

As it will be apparent from the equations (13) and (14), the frequency characteristic of the output signal $e_{out}$ takes a form as shown in FIG. 13. It will be observed from this graph that an output level changes according to frequencies, and that the level in the high and middle frequency bands varies as shown by a full line and broken lines depending upon the value of the variable resistance $r3$ of the control element.

FIG. 14 illustrates a bridge circuit in which a capacitor C and a coil L are used as the LC element circuit 151. In this circuit, the frequency characteristic of the output signal $e_{out}$ has, as shown in FIG. 15, a peak at a resonance point $f_1$ of the capacitor C and the coil L. The output signal level at this resonance frequency $f_1$ and in the frequency band which is in the neighbourhood of the resonance frequency $f_1$ varies as shown by a full line and broken lines depending upon the value of resistance $r3$ of the above described control element.

In the case wherein a frequency band is divided and the level in each divided band is controlled, two bridge circuits 210*a* and 210*b* (FIG. 16), having a construction similar to the bridge circuit shown in FIG. 14, are connected in parallel. The bridge circuits 210*a* and 210*b* are respectively controlled by control circuits 211*a* and 211*b*. In this case, the characteristic has peaks at two different resonance points $f_2$ and $f_3$ as shown in FIG. 17. The level is controlled at these resonance points $f_2$ and $f_3$ and the frequency band in the neighbourhood thereof.

According to this embodiment, the compressor and expandor are provided with bridge circuits by which the frequency characteristic is variably controlled in a predetermined frequency band, in accordance with the input signal level. Accordingly, frequency compression and expansion ratio changes in the predetermined frequency band (high and middle frequency bands where noise distribution is great). The compression and expansion operations are practically stopped and input-output characteristic becomes linear in a frequency band where noise distribution is low. Since the time constant circuit can be freely selected according to the state of a noise band, a dynamic operation can be completely compensated. The signal can be stabilized, whereby noise can be effectively reduced without increasing a modulation noise and deteriorating the tone quality.

Next to be described is one embodiment of a bias stabilizing circuit, for the control element circuit with reference to FIG. 20 and the subsequent figures. FIG. 20, shows one embodiment of the bias stabilizing circuit for the control element circuit in the compressor. As a control element in the control element circuit 220, a field-effect transistor (FET) 221 is used as a variable amplification degree active element is used. In this case, a DC bias is applied to the source of the FET 221, and a control signal is applied to the gate. Accordingly, the voltage $V_{GS}$ between the gate and source is changed. A resistance value $|Z|$ is changed between the source and a drain. Hence, in a constant AC signal, a constant voltage $V_{GS}$, that is, a constant resistance value $|Z|$ must be obtained, notwithstanding change of a power source voltage $V_{B+}$.

The gate-source voltage $V_{GS}$ to resistance value $|Z|$ characteristic is generally shown in FIG. 21. In order to decrease the value of resistance $|Z|$ against control in which a control signal increases in a positive direction, a positive bias voltage $V_{SO}$ is applied and a control signal voltage $V_G$ is applied to the gate. As a result, a value of resistance is obtained corresponding to the voltage $V_{GS} = V_{SO} - V_G$. Accordingly, as the control signal voltage $V_G$ increases, the voltage $V_{GS}$ decreases and the value of resistance $|Z|$ also decreases as shown in FIG. 21.

The circuit 220 (FIG. 20) is construed so tha a positive bias voltage, which corresponds to $V_{SO}$, is applied to the FET 221, whereby the value of resistance decreases as the control signal increases. More specifically, a forward current flows through silicon diodes 223 and 224 of a block 222 to obtain a stabilizing voltage, by utilizing a building-up characteristic of the diodes. This stabilizing voltage is supplied as bias to the FET 221. In this case, the FET 221 can obtain a value of resistance which is in accordance with the control signal voltage $V_G$ in spite of variation in the power source voltage $V_{B+}$.

In a rectifier circuit block 225, an AC signal applied to the base of a transistor 226 is amplified by one stage. The collector output from the transistor 226 is rectified in double voltage by a voltage doubler circuit including diodes 227 and 228 and capacitors 229 and 230. Incidentally, the dynamic characteristics of the expandor, i.e., attack time and recovery time are determined by the capacitors 229 and 230 and resistors 231, 232 and 233.

Figure 23A:
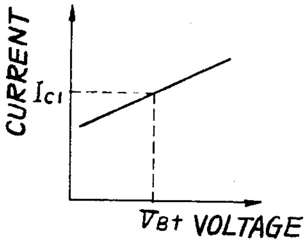
Figure 23B:
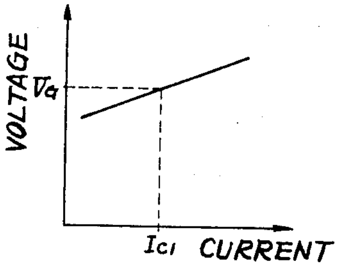
Figures 23C, 23D, 23E:
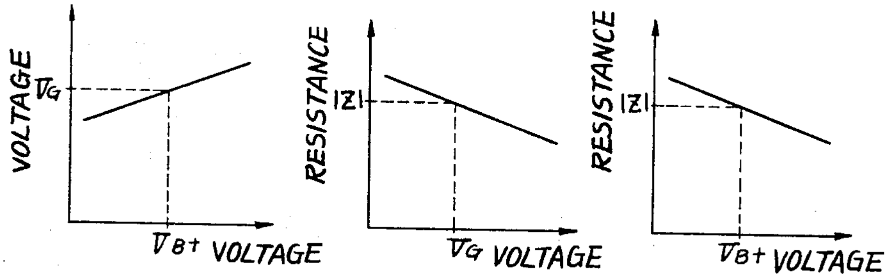

In a circuit as shown in FIG. 22, a bias is applied in a common manner. If a signal amplifying part and a voltage doubler circuit are combined in a control signal rectifier circuit, the collector voltage of the transistor 234 is maintained constant, in spite of variation in the voltage $V_{B+}$. Consequently, a circuit current $I_{C1}$ increases with the voltage $V_{B+}$, as shown in FIG. 23A. Accordingly, if a bias is applied in a common manner as shown in FIG. 22, in the circuit according to the invention, the output control voltage $V_G$ of the voltage doubler circuit on the collector side increases with the current $I_{C1}$ as shown in FIG. 23B, even if the AC signal input to the transistor 226 is constant. In this case, the control voltage $V_G$ is affected by the change of the power source voltage $V_{B+}$ as shown in FIG. 23C. Since the value of resistance $|Z|$ varies in accordance with the change of the voltage $V_G$ as shown in FIG. 23D, the value of resistance $|Z|$ varies in accordance with the change of the voltage $V_{B+}$ as shown in FIG. 23E. This prevents an accurate control of the circuit.

Therefore, in the circuit according to the invention, the forward stabilizing voltage of the silicon diodes 223 and 224, shown in FIG. 20, is supplied as a bias to the base of the transistor 226. This maintains the circuit current $I_{C1}$ constant. Accordingly, if the AC signal input to the transistor 226 is constant, the output voltage $V_G$ from the voltage doubler circuit is constant. The influence of the power source voltage $V_{B+}$ can be eliminated. A control voltage, in proportion to the level of the AC signal input, can be supplied to the FET 221. Further, in the circuit of this embodiment, the forward stabilizing voltage of the silicon diodes 223 and 234 is commonly used for the source bias of the FET 221 and the base bias of the transistor 226, whereby the circuit construction is simplified.

While the invention has been described with respect to specific embodiments, various modifications and variations thereof will be apparent to those skilled in the art without departing from the scope of the invention which is set forth in the appended claims.

What we claim is:

1. A noise reduction system employing a compression and expansion system comprising: compressor means including compression circuit means which compresses the amplitude of an input signal with a compression ratio which is variable in accordance with a control voltage applied thereto, said compression circuit means having two control element circuits including control elements with resistance values which vary in accordance with said control voltage, first control circuit means which generates a control voltage in accordance with the level of the output signal of said compression circuit means and applies said control voltage to said compression circuit means, a first signal splitting circuit means for splitting its input signal into two signals having mutually opposing phases and for supplying said two signals respectively to said two control element circuits, first phase inverting circuit means for inverting the phase of the output from one of said two control element circuits of said compression circuit means to mix said inverted output with the output from the other control element circuit; system means for transmitting said output signal of said compressor means; expandor means including negative feedback amplifier circuit means to which the output signal from said compressor is supplied after having been transmitted through said system means, said negative feedback amplifier circuit means having negative feedback circuit means for feeding back the output signal from said negative feedback amplifier circuit means to the input side thereof, said negative feedback circuit means having a feedback ratio which is variable in accordance with a control voltage applied thereto, second control circuit means to which the output signal from said compressor is supplied after having been transmitted through said system means, said second control circuit generating a control voltage in accordance with the level of the signal supplied thereto and applying it to said negative feedback circuit, two control element circuits having control elements with resistance values which vary in accordance with said control voltage, a second signal splitting circuit means for splitting its input signal into two signals having mutually opposing phases and supplying them respectively to said two control element circuits of said negative feedback circuit, and a second phase inverting circuit for inverting the phase of the output from one of said two control element circuit means to mix said output with the output from the other control element circuit, wherein a coefficient k of a total amplitude control characteristic of said compressor and a feedback ratio $\beta$ of said negative feedback circuit are selected to be substantially equal to each other.

2. The system as defined in claim 1 wherein said signal transmission system means comprises a recording medium and means for recording the output signal from said compressor on said recording medium, and means for reproducing the recorded signal from said recording medium.

3. In the system as defined in claim 1, wherein said transmission system comprises a recording medium on which the output signal from said compressor is recorded.

4. The system as defined in claim 1 wherein said compression circuit and said negative feedback circuit means have substantially the same circuit construction, and said first control circuit means and said second control circuit means have substantially the same circuit construction.

5. The system as defined in claim 1 wherein each of said compression circuit means and said negative feedback circuit means respectively comprise a bridge circuit having in one branch a control element with a resistance value which varies in accordance with said control voltage and having an element connected in said bridge connection, the impedance of said last named element varying with frequency.

6. The system as defined in claim 5 wherein said control element which has a resistance value which varies in accordance with said control voltage comprises NPN type and PNP type transistors which are connected in parallel with each other.

7. An expansion apparatus for use in the system as defined in claim 1, said expansion apparatus comprising a second negative feedback amplifier circuit, means for supplying the output signal from said compressor means as an input signal to said second negative feedback amplifier after said signal has been transmitted through the signal transmission system, the negative feedback amplifier circuit means further including a negative feedback circuit for feeding back the output signal from said negative feedback amplifier circuit to the input side thereof, the feedback ratio being variable in accordance with a control voltage applied thereto, control circuit means to which the output signal from said compressor is supplied after being transmitted through said signal transmission system means for generating a control voltage in accordance with the level of the supplied output signal and for applying said control voltage to said expansion circuit.

8. The apparatus as defined in claim 7 wherein said expansion circuit means comprises two control element circuits comprising control elements with resistance values which are variable in accordance with said control voltage, said apparatus further comprising a signal splitting circuit for splitting its input signal into two signals having mutually opposite phases and suppying them respectively to said two control element circuits, and phase inverting circuit means for inverting the phases of the output of one of said two control element circuits to mix said output with the other control element circuit.

9. The apparatus as defined in claim 7 wherein said expansion circuit comprises an active element with a variable amplification degree for providing a resistance value which is variable in accordance with said control voltage and which is biased by said control voltage, said expansion apparatus further comprising a bias stabilizing circuit comprising an amplifier which drives said active element having said variable amplification degree responsive to an output of said amplifier, and circuit means comprising a diode which detects a very small variation of a power source voltage for supplying a bias to said active element with a variable amplification degree to simultaneously vary the bias of said amplifier, wherein a voltage between a gate and the degree active element are equivalently maintained at a constant value.

10. The apparatus as defined in claim 7 wherein said expansion circuit means comprises a bridge circuit having in one branch a control element with a resistance value which is variable in accordance with said control voltage and having an element with an impedance which varies with a frequency connected in bridge connection.

11. The apparatus as defined in claim 10 wherein said control element resistance which varies in accordance with said control voltage comprises NPN type and PNP type transistors which are connected in parallel with each other.

12. A noise reduction system employing a compression and expansion system comprising: compressor means including compression circuit means which compresses the amplitude of an input signal having a predetermined band width, said compressor acting on a narrow frequency band having less than said predetermined width with a compression ratio which is variable in accordance with control voltage applied thereto, first control circuit means which generates a control voltage in accordance with the level of the output signal of said compression circuit means and applies said control voltage to said compression circuit means; system means for transmitting said compression circuit output signal; expandor means including a negative feedback amplifier circuit means to which the output signal from said compressor is supplied after having been transmitted through said transmitting system means, said negative feedback amplifier circuit means having a negative feedback circuit means for feeding back the output signal from said negative feedback amplifier means to the input side thereof, said negative feedback circuit means having a feedback ratio which is variable in said narrow frequency band in accordance with a control voltage applied thereto, and second control circuit means to which the output signal from said compressor means is supplied after having been transmitted through said transmitting system means, said second control circuit generating a control voltage in accordance with the level of the signal supplied thereto and applying control voltage to said negative feedback circuit, wherein a coefficient $k$ of a total amplitude control characteristic of said compressor means and feedback ratio $\beta$ of said negative feedback are selected to be substantially equal to each other.

13. The system as defined in claim 12 wherein said narrow frequency band is the frequency band in which the noise distribution is greater.

14. The system as defined in claim 12 wherein said narrow frequency band is the high and middle frequency bands of an audio frequency range.

15. The system as defined in claim 12 wherein said compressor means further includes a first filter circuit to which is applied the output signal of said compression circuit means, said first filter passing the signal only in said narrow frequency band, and means for applying said signal which passes through said first filter circuit to said first control circuit means; said expandor means further including a second filter circuit to which is applied the output signal from said compressor means, said second filter passing the signal only in said narrow frequency band, and means for applying said signal which passes through said second filter circuit to said second control circuit means.

16. The system as defined in claim 12 wherein said signal transmission system means comprises a recording medium, means for recording the output signal from said compressor means on said recording medium, and means for reproducing the recorded signal from said recording medium.

17. The apparatus as defined in claim 12 further comprising a filter circuit to which is applied the output signal from said compressor means, said filter circuit passing the signal only in said narrow frequency band, and means for applying said signal which passes through said filter circuit to said second control circuit means.

* * * * *